June 7, 1949.                    H. R. BANKS                    2,472,460
                              VEGETABLE PEELER
Filed Feb. 4, 1946                                         2 Sheets-Sheet 1
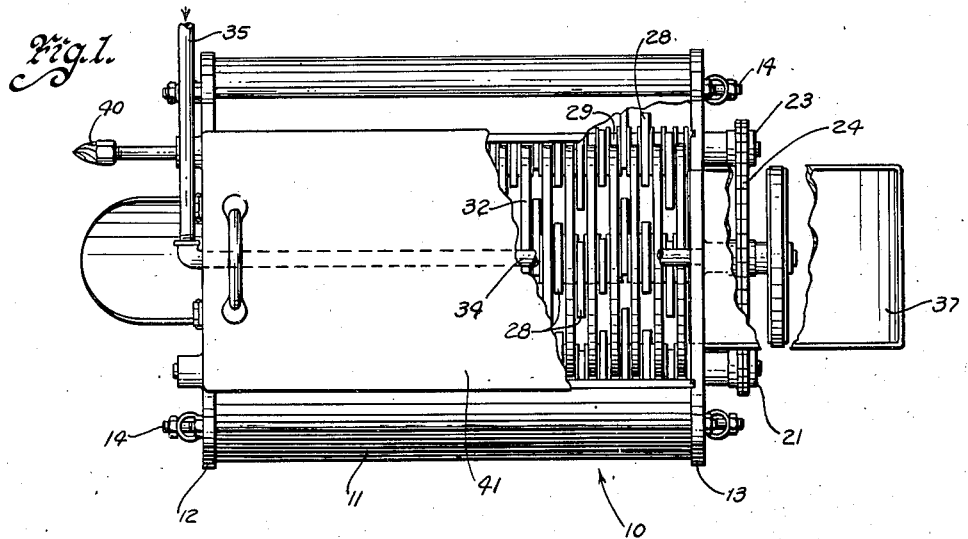
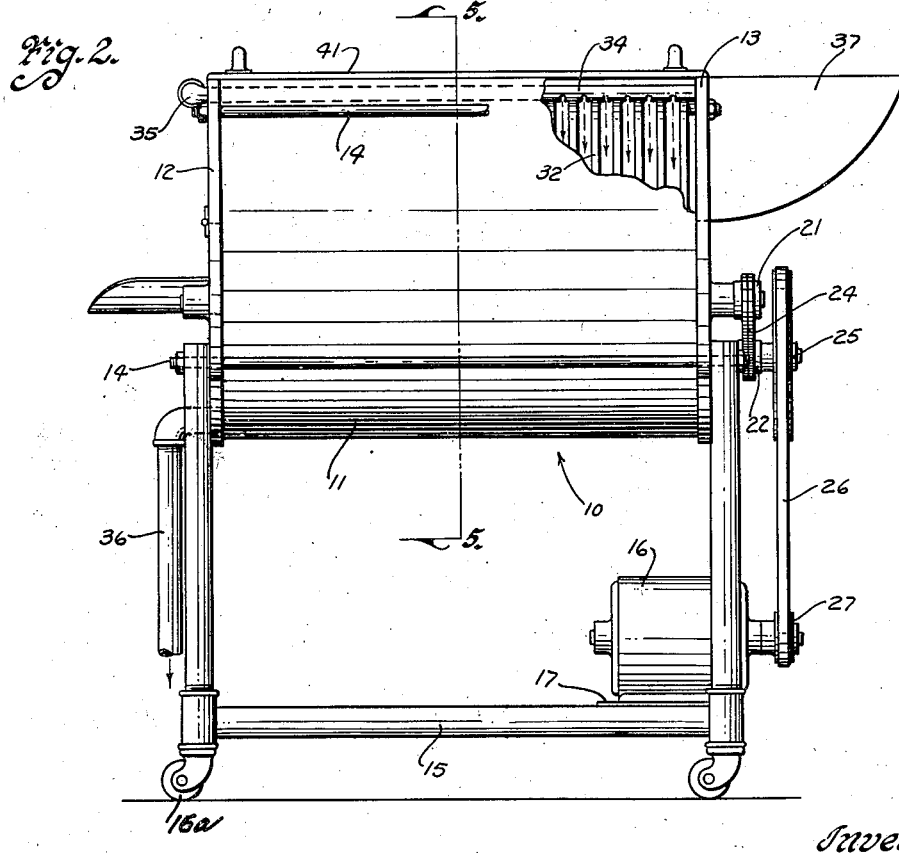
Witness
Edward P. Seeley
Inventor
Harry R. Banks,
Harry L. Yinger
Attorney June 7, 1949. H. R. BANKS 2,472,460
VEGETABLE PEELER
Filed Feb. 4, 1946 2 Sheets-Sheet 2
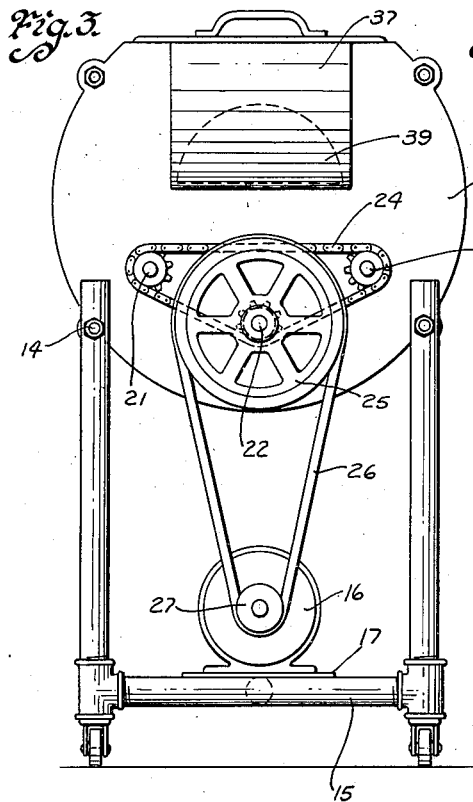
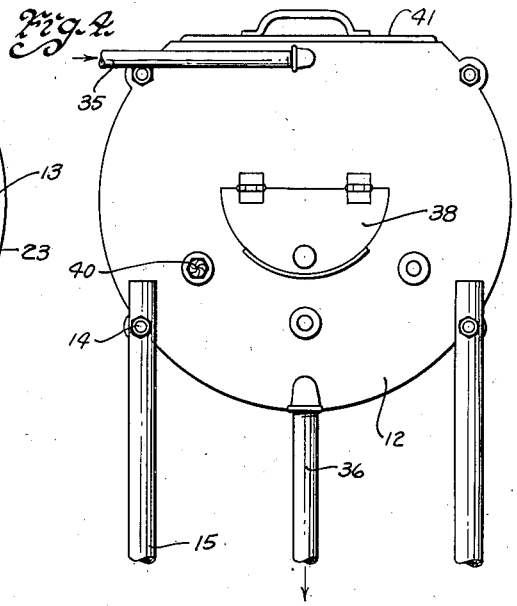
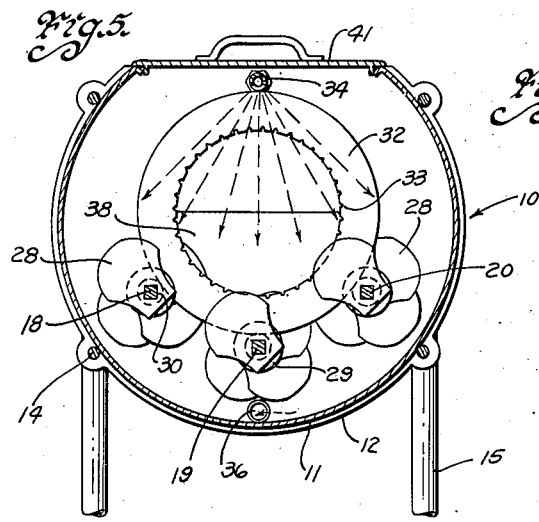
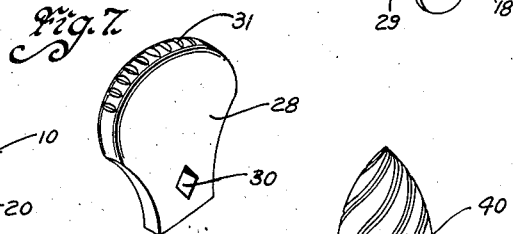
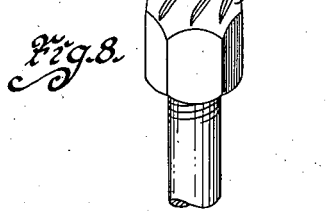
Inventor
Harry R. Banks
Harry L. Yinger
Attorney
Witness
Edward P. Seeley Patented June 7, 1949

2,472,460

UNITED STATES PATENT OFFICE 2,472,460

VEGETABLE PEELER

Harry R. Banks, Creston, Iowa, assignor of one-half to C. A. Overturf, Algonac, Mich.

Application February 4, 1946, Serial No. 645,347

3 Claims. (Cl. 146—49)

This invention relates to a new and novel vegetable peeler and more particularly to a vegetable peeler wherein the process of peeling is practiced as a continuous process or a batch process as desired.

By hand and using potatoes as an example, a good peeler can peel 100 pounds of potatoes in from two and one-half hours to three hours. It is necessary to go deep into the potato meat in order to remove the peeling hence there is a loss or waste of from 17 percent to 21 percent by hand peeling. This loss or waste is very material when the price of potatoes is high and further, the valuable mineral content of a potato lies right under the skin and with this percentage of wastage, it is almost certain that the mineral content is included in the wastage. In the serving of potatoes as food, custom demands that potatoes be peeled. It is almost essential that mashed potatoes be free of skins and custom insists that fried and French fried potatoes be free thereof if for no other reason than the appearance of the food on a plate. Sweet potatoes, turnips, carrots and parsnips follow a like pattern.

At the present time, there is being offered commercially, potato peeling machines operating on the centrifugal principle wherein the machine has an abrasive side wall and bottom and the potatoes are thrown against the side wall and bottom by centrifugal force and the potatoes abraded by the side wall or bottom of the machine. These machines offer a batch process with water circulating continuously through the machine to wash away the particles abraded from the potatoes. The loss or wastage on potatoes peeled by these machines is dependent on a time factor; namely, how long they are allowed to remain in the machine. The loss may run as high as 25 per cent or the whole potato may be abraded away if the machine is not operated by a skilled operator or is neglected for any reason. This type of machine can't peel knotty places on potatoes or hollow spots without bringing the potato to a uniform size. This means a tremendous loss in potato meat to wear the potato down to a uniform size.

It is an object of the invention among others to provide a vegetable peeler that will remove skin or peelings from vegetables at a minimum loss or wastage of the desirable portion of the vegetable. A vegetable peeler that reduces the time factor involved in preparing a vegetable for cooking; a vegetable peeler that greatly reduces the cost of preparing a vegetable for cooking; a vegetable peeler that is economical in initial purchase price, operation and in upkeep; a vegetable peeler that is easy and simple to operate so that a skilled operator is not necessary; a vegetable peeler continuous in operation or that may be operated as a batch process if desired and one that is kept clean and sanitary at all times.

In carrying out the objects of the invention there is provided a vegetable peeler comprising a container. Within the container is a knocker mechanism, which is rotatable and delivers impact blows to the vegetables in the container to remove peelings therefrom. There are included means in the container which may be a disc arrangement to give a rotary motion to the vegetables in the container and said disc arrangement is rotatable by the knocker mechanism. There is included in the top of the container a spray means to spray the vegetables and wash the peelings to the bottom of the container. The knockers are mounted on a series of shafts journaled in the container and a motor is associated with the container to rotate the shaft and knockers. The disc arrangement is operable from the shafts by pulleys mounted on the shafts between the knockers.

If it is desired to operate the vegetable peeler as a continuous process there is provided an inlet for vegetables to be peeled and an outlet for peeled vegetables with the vegetables being continuously fed into the container through the inlet end and peeled vegetables issuing continuously from the outlet end. Alternate knockers on the shafts are angularly spaced, for instance 90 degrees, to give a helical motion to the vegetables and thus advance the vegetables from the inlet end to the outlet end.

With the foregoing and other objects in view, the invention will be more fully described hereinafter and will be particularly pointed out in the claims appended hereto.

In the drawings, wherein like symbols refer to like or corresponding parts throughout the several views:

Figure 1 is a top plan view of the vegetable peeler with a portion of a lid covering the peeler broken away to show the interior of the container and a feed hopper is broken away to show drive mechanism.

Figure 2 is a side elevational view of the vegetable peeler with a portion of the container broken away to show spray means.

Figure 3 is an end elevational view of the vegetable peeler from the inlet end of the peeler.

Figure 4 is an end elevational view of the vegetable peeler from the outlet end of the peeler.

Figure 5 is a sectional view through the container of the vegetable peeler taken on the line 5—5 of Figure 2.

Figure 6 is a perspective view of a shaft showing knockers angularly spaced on the shaft and alternately mounted on the shaft between pulleys.

Figure 7 is a perspective view of one knocker member.

Figure 8 is a perspective view of a drill mounted on the outlet end for removing eyes from peeled potatoes.

The vegetable peeler is represented as having a container 10 which in the drawings is shown as being substantially cylindrical. The container 10 is made up of cylindrical portion 11 and end portions 12 and 13. The cylindrical portion 11 and end portions 12 and 13 are held in assembled position by four or more tie rods, one of said tie rods 14 being clearly shown in Figure 2. A cork gasket has been found very efficient for sealing the joint between the cylindrical portion 11 and end portions 12 and 13 and been found to have a long life. The cylindrical portion 11 has been made of stainless steel and aluminum has also been used successfully. The inner surface of the cylindrical portion 11 and end portions 12 and 13 must be smooth. Any material that is pitted will only serve as a collecting means for starch from the vegetable being peeled which will ferment and cause an unsanitary condition and the fermented starch may have a chemical reaction with metal other than stainless steel or aluminum. Stainless steel and aluminum are not affected by fermenting starch and the smooth surface doesn't allow starch to collect and create an unsanitary condition. The end portions 12 and 13 in the present instance are made of cast aluminum in order to cut down on the material's cost.

The container 10 is mounted on a supporting structure which may take any form and should be constructed to make the peeler portable. In the present instance the container 10 is mounted on a supporting structure 15 made of ordinary pipe, screw threaded together and having casters 16a on each corner to make the peeler portable. A motor 16 is mounted on a platform 17 attached to the supporting structure 15. The motor may be any type motor and a one-quarter horsepower motor has been found of sufficient capacity to operate the peeler.

Shafts 18, 19 and 20 have each end thereof journaled in end portions 12 and 13 in standard bronze bearings (not shown). On the ends of shafts 18, 19 and 20, on the inlet end of the peeler, are sprocket wheels 21, 22 and 23 with said sprocket wheels being connected by sprocket chain 24. The sprocket chain is an ordinary commercial No. 40 sprocket chain. A pulley 25 is connected to shaft 19 which pulley 25 is in turn connected by V-belt 26 to a pulley 27 mounted on motor 16. Motor 16 rotates pulley 27 which in turn actuates V-belt 26 to turn pulley 25 and thus rotate shafts 18, 19 and 20 through sprocket wheels 21, 22 and 23 and sprocket chain 24. The motive power assembly on the inlet end of the peeler may be covered with a guard (not shown) to protect an operator from the moving parts.

The shafts 18, 19 and 20 are square and have alternately mounted thereon knocker members 28 and pulleys 29 as represented in Figure 6. Figure 7 shows a close-up view of a knocker element showing a square opening 30 to allow knocker 28 to be fitted on the shafts. Pulley 29 also has a square opening to allow the pulleys to fit on to the shafts. The knockers 28 are slotted at 31 on their contacting edge as clearly shown in Figure 7. In assembling knockers 28 and pulleys 29 on a shaft, the shaft is removed from the peeler and the knocker member 28 and pulley members 29 are alternately mounted on a shaft member. Figure 6 is merely representative, but for a container 40 inches long, 18 to 19 knockers have been found sufficient for the peeling operation. As can be readily seen from the figures of the drawing, in placing the knockers on the shafts, alternate knockers are revolved through a 90 degree angle when placed on the shaft. Tie rods 14 are loosened, thus allowing cylindrical member 11 and end portions 12 and 13 to be disassembled. The ends of shafts 18, 19 and 20 are fitted into inlet end portion 13 after which end portion 12 is fitted into place receiving the other ends of shaft 18, 19 and 20 and tie bolts 14 tightened to form the container 10 with shafts 18, 19 and 20, knockers 28 and pulleys 29 in place on the shafts. Lid 41 on top of the container 10 is removed, opening the top of container 10 and discs 32 having grooves 33 on the inner surface thereof are mounted on pulleys 29, as best seen in Figure 5. The discs 32 are in the form of an annular ring with a circular opening.

In the top of container 10 is mounted a spray pipe 34, which should be of stainless steel and has an inlet pipe 35 delivering water to the spray pipe from an ordinary water main. Vegetables in passing through the peeler are sprayed with water at all times thus cleansing the vegetables and washing the peelings to the bottom of the container. Drain pipe 36 connects into a sewerage system and carries away the spray water with peelings therein. The pressure of the spray water tends to drive peelings to the bottom of the container with the spray water also cleansing the walls of the container to keep them in a clean and sanitary condition. There will never be a water level in the bottom of the container since the drain pipe 36 is twice the size of the inlet pipe 34 to insure adequate drainage. The shafts 18, 19 and 20 are of high carbon steel but are completely covered within the container 10 by the knockers 28 and pulleys 29 hence starch and liquid cannot come into contact with these shafts and cause pitting or corrosion thereof. Each end of shafts 18, 19 and 20 have grease cups (not shown) for lubricating the bearing surfaces and a soft or liquid oil is used for this purpose. Any leakage of oil through the bearings into the container will occur at a point in the container below the level of vegetables being peeled and will go out with the waste water through the drain, hence there is no possibility of the vegetables becoming contaminated by lubricant. There is from three-quarters of an inch to one inch clearance between the bottom of container 10 and knockers 28 when knockers 28 are in their extreme downwardly rotational position hence the knockers will not contact any drainage in the bottom of container 10 and contaminate the vegetables in process of being peeled.

On the inlet end of the peeler is a hopper 37 of stainless steel which feeds unpeeled vegetables into the peeler. The hopper 37 is removable from the peeler for moving, storage and for getting to the moving parts for repair. The hopper just hooks over the end portion 13 (not shown) and vegetables are fed by gravity into the peeler. In the outlet end or end portion 12 is an opening closed by a spring door 38 to deliver peeled vegetables from the peeler. The door 38 is the same size as the opening in end portion 12 and further the opening in the end portion 12 is the same size as the entrance opening 39 (shown in dotted line Figure 3) in the end portion 13. The spring (not shown) is made of a sufficient strength that if the peeler is full of vegetables and the hopper 37 empty, the door 38 will not be opened. When the hopper 37 is full of vegetables a gravity pressure is exerted on the vegetables in process through the peeler, sufficient to open door 38 and make a continuous flow of vegetables through the peeler so long as hopper 37 is kept full of vegetables.

In operation of the peeler, it is essential that initially the space defined by discs 32, which is in effect a conduit within the container 10, be full of vegetables and hopper 37 empty to begin the peeling operation whether the machine is being used as a batch process or continuous process. The motor 16 is set into motion rotating pulley 27 with V-belt 26 transmitting the rotary motion of motor 16 to pulley 25. By means of sprocket wheels 21, 22 and 23 through sprocket chain 24 the rotary motion of pulley 25 is transmitted to shafts 18, 19 and 20 which in turn rotate knockers 28 and pulleys 29 mounted on the shafts 18, 19 and 20. The knockers 28 extend into the conduit defined by discs 32 and operate on the vegetables in the conduit 10 to deliver impact blows to the vegetables and remove a portion of the peeling by means of said impact blows. The vegetables are allowed to remain in the conduit and be contacted by the knockers for the requisite length of time. The requisite time is determined by the speed of the machine, which may be controlled by the size of pulley 27 on the motor or by the vegetable itself. For instance, in February and March after potatoes have been stored all winter, the potatoes are more or less soft and will tend to absorb the impact blows of knockers 28. It is necessary in this case to speed up the machine in order to peel the vegetables. It is noted that knockers 28 have grooves 31. It has been found that knockers minus grooves were effective but it takes a longer period of time to remove the peelings.

Applicant has found that when the peeling is removed from the vegetable it can pass through the conduit and be further contacted by the knockers and no meat will be lost from the vegetable. Applicant advances the following theory for this statement: It is thought that the peeling of a vegetable has a certain amount of mineral content in the peeling from the soil in which it is raised which gives the peeling an abrasive quality. As long as the abrasive peeling is presented to the knockers 28, frictional resistance will occur and knockers 28 will remove the abrasive surface. When the abrasive peeling has been removed and the vegetable is smooth and even the knockers 28 are ineffective in removing the vegetable meat because frictional resistance has been reduced by removing the peeling. The peeler can be used for potatoes, sweet potatoes, turnips, parsnips and carrots with equal efficiency but will bruise apples, pears, peaches and most fruits.

The knockers 28 were described as being angularly mounted on the shafts and are shown in the drawings with adjacent knockers 28 being revolved 90 degrees. The particular 90 degrees spacing is not critical to the operation of the peeler but has just been used to illustrate the principle involved and the spacing could just as well be 30, 60 or 120 degrees as far as the operation of the machine is concerned. The important feature is that the angularly spaced knockers present an augur effect or a spiral route through the conduit for the vegetables in process through the peeler to advance them from the inlet end to the outlet end. Each knocker 28 tends to revolve the vegetables somewhat and move them forward in the conduit by the impact blow delivered. This helps to move the vegetables so that the same surface is not continually presented to the knockers. It is immaterial whether the knockers on the three shafts, in any plane cut through the container, or in other words those knockers that are parallel, be in the same angular position on the shafts for the proper functioning of the peeler.

If the peeler is operated as a batch process the container 10 is loaded with vegetables to be peeled but the hopper 37 is empty. The peeler is set into motion and the knockers 28 allowed to contact the vegetables and the peeler operated until the peelings are all removed. The spring on door 38 is strong enough to hold the vegetables in the peeler until it is desired to remove the vegetables in the conduit when door 38 is opened and the vegetables allowed to leave the peeler. The capacity of the machine is approximately one peck and when no larger quantity of a vegetable is desired the peeler is operated in this manner. If a larger quantity is desired, vegetables are entered into hopper 37, after the conduit has been filled and the knockers have had sufficient time to remove the peelings as in the batch process described above. The weight of vegetables in hopper 37 places a pressure on the vegetables in process in the conduit, sufficient to open the door 38 against the tension of the spring tending to hold it closed. The entrance opening 39 is the same size as the exit opening hence the same amount of vegetables enter the machine as leave therefrom. During the operation of the peeler as either a batch or a continuous process the water spray is on and operates in the manner previously described. Operated as a continuous process the peeler will turn out approximately 8 bushels of vegetables per hour.

The discs 32 that revolve on pulleys 29 have a very important function in the operation of the peeler besides forming a conduit for the passage of vegetables through the peeler. They necessarily revolve at a slower speed than the knockers in view of the large amount of slippage between the discs and pulleys 29 as they ride in a groove in the pulleys, which allows a large amount of slippage and the larger circumference of the discs 32 with relation to pulleys 29. The discs 32 serve the purpose of providing an additional rotational means for vegetables in process of peeling in the peeler. The discs tend to keep the vegetables rolling and turning over and continually moving the surface just contacted by the knockers 28 and presenting a new surface to be contacted by the knockers. The discs 32 further tend to prevent wedging between the knockers 28. The tendency of the vegetables in process is to move away from knockers 28 at all times. The discs help to move the vegetable into another knocker 28.

A drill 40, best shown in Figure 8, may be included on any one of the shafts 18, 19 or 20 on the outlet end of the peeler for removing any eyes from potatoes, that the knockers will not remove. Vegetables are inspected after passing through the peeler for rotten spots, bruised places, worm holes, etc., and the drill is used in removing them. Suitable containers are providing for catching the drillings.

The vegetable peeler cost is held to an absolute minimum by casting most of the working parts and rolling the parts that cannot be cast. The only machine work necessary in the whole peeler is on the ends of shafts 18, 19, and 20 to provide a proper bearing surface on these shafts.

While the invention has been described in connection with one embodiment, it is to be understood that the words which have been used are words of description rather than of limitation, and that practice of the invention within the scope of the appended claims may be resorted to without departing from the true scope of the invention in all its aspects.

I claim:

1. A vegetable peeler comprising a substantially cylindrical container, means mounting the container with its axis horizontal, a series of shafts the opposite ends of which are journaled in the end walls of the container, said shafts being parallel and forming a cradle-like support, each shaft having knockers and pulleys alternately mounted thereon, drive means for rotating all the shafts, knockers and pulleys about their own respective axes, axially aligned annular members having peripheries resting upon and driven by the pulleys on the shafts, said annular members forming a conduit through which vegetables pass from one end to the other of the container, and the knockers extending radially beyond the peripheries of the pulleys and into the conduit between the annular members to peel the vegetables by impact thereon.

2. A vegetable peeler comprising a substantially cylindrical container means mounting the container with its axis horizontal, a series of shafts the opposite ends of which are journaled in the end walls of the container, said shafts being parallel and forming a cradle-like support, each shaft having knockers and pulleys alternately mounted thereon, drive means for rotating all the shafts, knockers and pulleys about their own respective axes, axially aligned annular members having peripheries resting upon and driven by the pulleys on the shafts, said annular members forming a conduit through which vegetables pass from one end to the other of the container, an inlet for vegetables in one end wall entering vegetables into the conduit, an outlet in the other end wall connecting with the conduit through which the vegetables leave the peeler and the knockers extending radially beyond the peripheries of the pulleys and into the conduit between the annular members to peel the vegetables by impact thereon.

3. A vegetable peeler comprising a substantially cylindrical container means mounting the container with its axis horizontal, a series of shafts the opposite ends of which are journaled in the end walls of the container, said shafts being parallel and forming a cradle-like support, each shaft having knockers and pulleys alternately mounted thereon, drive means for rotating all the shafts, knockers and pulleys about their own respective axes, axially aligned annular members having peripheries resting upon and driven by the pulleys on the shafts, said annular members forming a conduit through which vegetables pass from one end to the other of the container, knockers on the respective shafts being mounted at different angular positions of the respective shafts extending radially beyond the peripheries of the pulleys and into the conduit between the annular members impart a helical motion to the vegetables in the conduit to move the vegetable through the conduit from the inlet to the outlet of the container.

HARRY R. BANKS.

REFERENCES CITED

The following references are of record in the file of this patent:

UNITED STATES PATENTS

| Number | Name | Date |
|---|---|---|
| 633,486 | Rader | Sept. 19, 1899 |
| 1,062,935 | Trust | May 27, 1913 |
| 1,226,418 | Trust | May 15, 1917 |
| 1,441,161 | McCabe | Jan. 2, 1923 |
| 1,460,747 | Crowell | July 3, 1923 |
| 1,637,830 | Mannsdorff | Aug. 2, 1927 |
| 2,021,970 | Urschel | Nov. 26, 1935 |

FOREIGN PATENTS

| Number | Country | Date |
|---|---|---|
| 27,912 | Germany | July 17, 1884 |